US012715168B2

(12) United States Patent
Sehovic

(10) Patent No.: US 12,715,168 B2
(45) Date of Patent: Aug. 25, 2026

(54) EXTRUDER ASSEMBLY

(71) Applicant: Milacron Marketing Company LLC, Batavia, OH (US)

(72) Inventor: Jasmin Sehovic, Clearwater, FL (US)

(73) Assignee: Milacron Marketing Company LLC, Batavia, OH (US)

( * ) Notice: Subject to any disclaimer, the term of this patent is extended or adjusted under 35 U.S.C. 154(b) by 387 days.

(21) Appl. No.: 18/319,885

(22) Filed: May 18, 2023

(65) Prior Publication Data

US 2024/0383185 A1 Nov. 21, 2024

(51) Int. Cl.

| | |
|---|---|
| ***B29C 48/34*** | (2019.01) |
| ***B29C 48/05*** | (2019.01) |
| ***B29C 48/154*** | (2019.01) |
| ***B29C 48/19*** | (2019.01) |
| ***B29C 48/21*** | (2019.01) |
| ***B29C 48/335*** | (2019.01) |
| ***H01B 13/14*** | (2006.01) |
| *B29L 31/34* | (2006.01) |

(52) U.S. Cl.

CPC .............. *B29C 48/21* (2019.02); *B29C 48/05* (2019.02); *B29C 48/154* (2019.02); *B29L 2031/3462* (2013.01)

(58) Field of Classification Search

CPC ....... B29C 48/21; B29C 48/05; B29C 48/154; B29C 48/19; B29C 48/34; B29C 48/06; B29C 48/18; B29C 48/3366; B29L 2031/3462; H01B 13/141; H01B 13/143

See application file for complete search history.

(56) References Cited

U.S. PATENT DOCUMENTS 4,248,824 A 2/1981 Hattop
4,484,877 A * 11/1984 Stucke .................... B29C 48/21 425/467
10,770,202 B1 9/2020 Ledbetter

FOREIGN PATENT DOCUMENTS

CH 675982 A5 11/1990
DE 3122043 A1 12/1982

OTHER PUBLICATIONS

English translation of CH 675982A5 (Year: 1990).*
European Search Report and Office Action issued in EP Application No. 24171100.1 dated Oct. 2, 2024.

* cited by examiner

*Primary Examiner* — Galen H Hauth
*Assistant Examiner* — Baileigh Kate Darnell
(74) *Attorney, Agent, or Firm* — Taft Stettinius & Hollister LLP

(57) ABSTRACT

An extruder assembly comprising a barrel, through which a conductor can travel; a first subassembly for extruding a first sleeve on the conductor; and a second subassembly for extruding a second sleeve onto the first sleeve, the second sleeve comprising a first portion, a second portion, and a cross-section comprising a first annulus sector and a second annulus sector, the first portion comprising the first annulus sector, the second portion comprising the second annulus sector, the first and second portions are in contact with the first sleeve.

10 Claims, 10 Drawing Sheets

EXTRUDER ASSEMBLY

FIELD

The present application relates generally to extruder assemblies, and in particular, to extruder assemblies to extrude striped wires.

BACKGROUND

A wire can comprise a conductor with one or more than one sleeve protecting the conductor. An extruder assembly can be used to extrude protective sleeves onto a conductor to manufacture a wire. Some wires comprise a conductor with a first sleeve made of insulation material (e.g., HDPE, LDPE, Flex PVC and other suitable materials) which is covered by a second sleeve made of protective material (e.g., HDPE, LDPE, Flex PVC and other suitable materials). A stripe is often added onto the second sleeve to help identify the wire.

BRIEF SUMMARY

An aspect of the present application provides an extruder assembly comprising: a barrel, through which a conductor can travel; a first subassembly for extruding a first sleeve on the conductor; and a second subassembly for extruding a second sleeve onto the first sleeve, the second sleeve comprising a first portion, a second portion, and a cross-section comprising a first annulus sector and a second annulus sector, the first portion comprising the first annulus sector, the second portion comprising the second annulus sector, the first and second portions are in contact with the first sleeve, the first subassembly and the second subassembly cooperate with the barrel to define a first channel to extrude the two sleeves onto the conductor, the second subassembly defining a second channel and a third channel, the first, second, and third channels are all annular channels, the second channel to extrude the first portion, the third channel to extrude the second portion, the second channel is in fluid communication with the first channel via a first opening, the second subassembly comprising a protrusion blocking partially the first opening at a location of the protrusion, the third channel is in fluid communication with the first channel via a second opening at a location downstream of the location of the protrusion.

The second subassembly can comprise a first member and a second member defining the second channel.

The second channel can comprise a ring portion and a truncated cone shaped portion connecting the ring portion to the first channel.

The first member can cooperate with the second member to define the ring portion.

The second member can define the truncated cone shaped portion.

The first member can comprise a portion of the protrusion.

The second member can comprise an another portion of the protrusion.

The second subassembly can comprise a third member and a fourth member defining the third channel.

The third channel can comprise a ring portion and a third annular sector portion connecting the ring portion to the first channel.

The third channel can be downstream of the second channel.

The fourth member can comprise an outer curved surface and an inner curved surface, the outer curved surface can cooperate with the third member to define the third channel, and the inner curved surface can cooperate with a downstream portion of the barrel to define a downstream portion of the first channel.

The ring portion of the third channel can be downstream of the ring portion of the second channel.

The third annular sector portion can include an opening upstream of the ring portion of the third channel to allow a molten material to flow from the ring portion of the third channel into the first channel.

The extruder assembly can comprise an another protrusion partially blocking the first opening at a location of the another protrusion, the third channel is in fluid communication with the first channel via a third channel opening at a location downstream of the location of the another protrusion.

BRIEF DESCRIPTION OF THE DRAWINGS

The drawings are not to scale.

DETAILED DESCRIPTION

Figure 1:
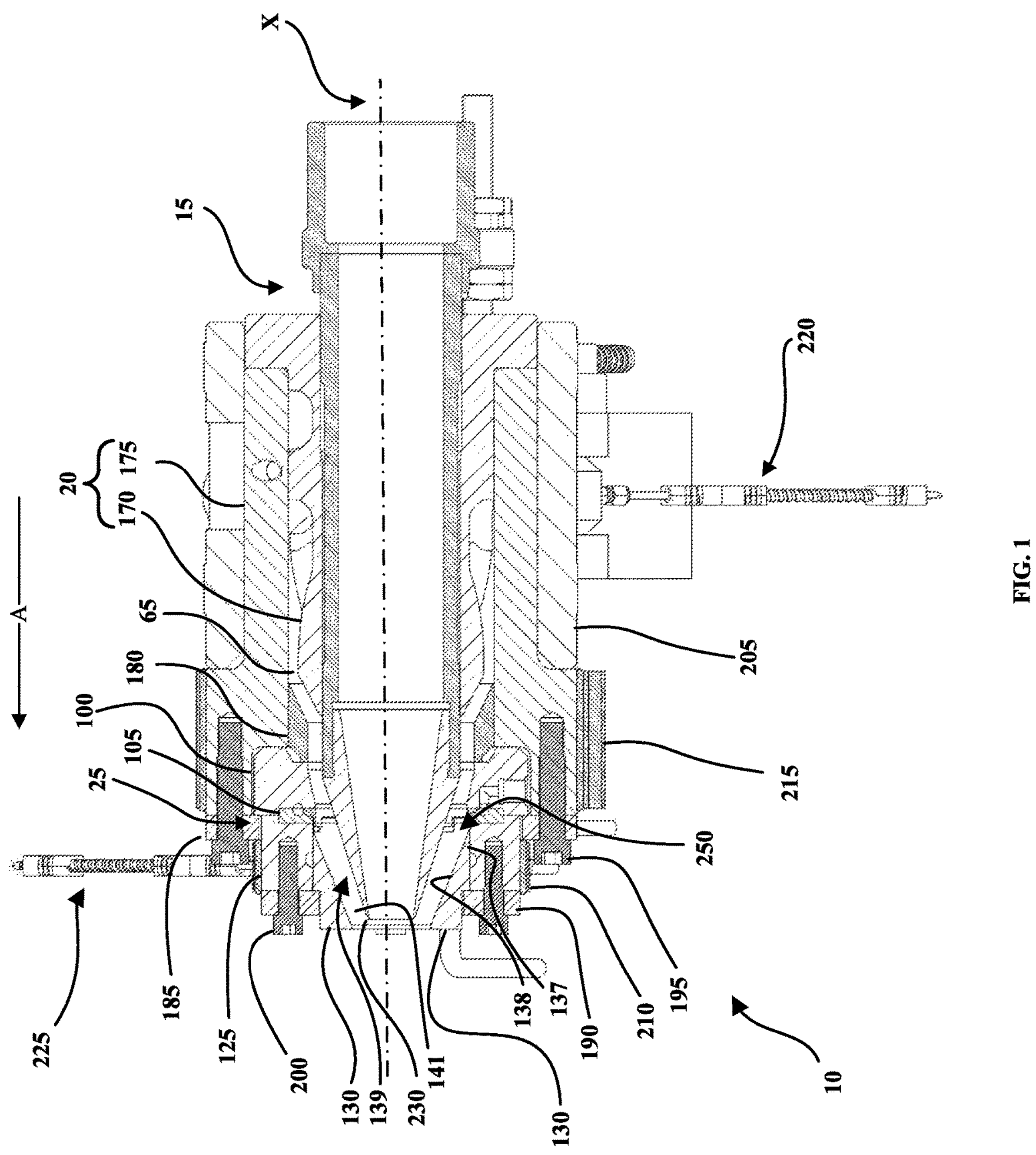
FIG. 1 is a sectional view of an extruder assembly according to an embodiment of the present application.
Figure 2:
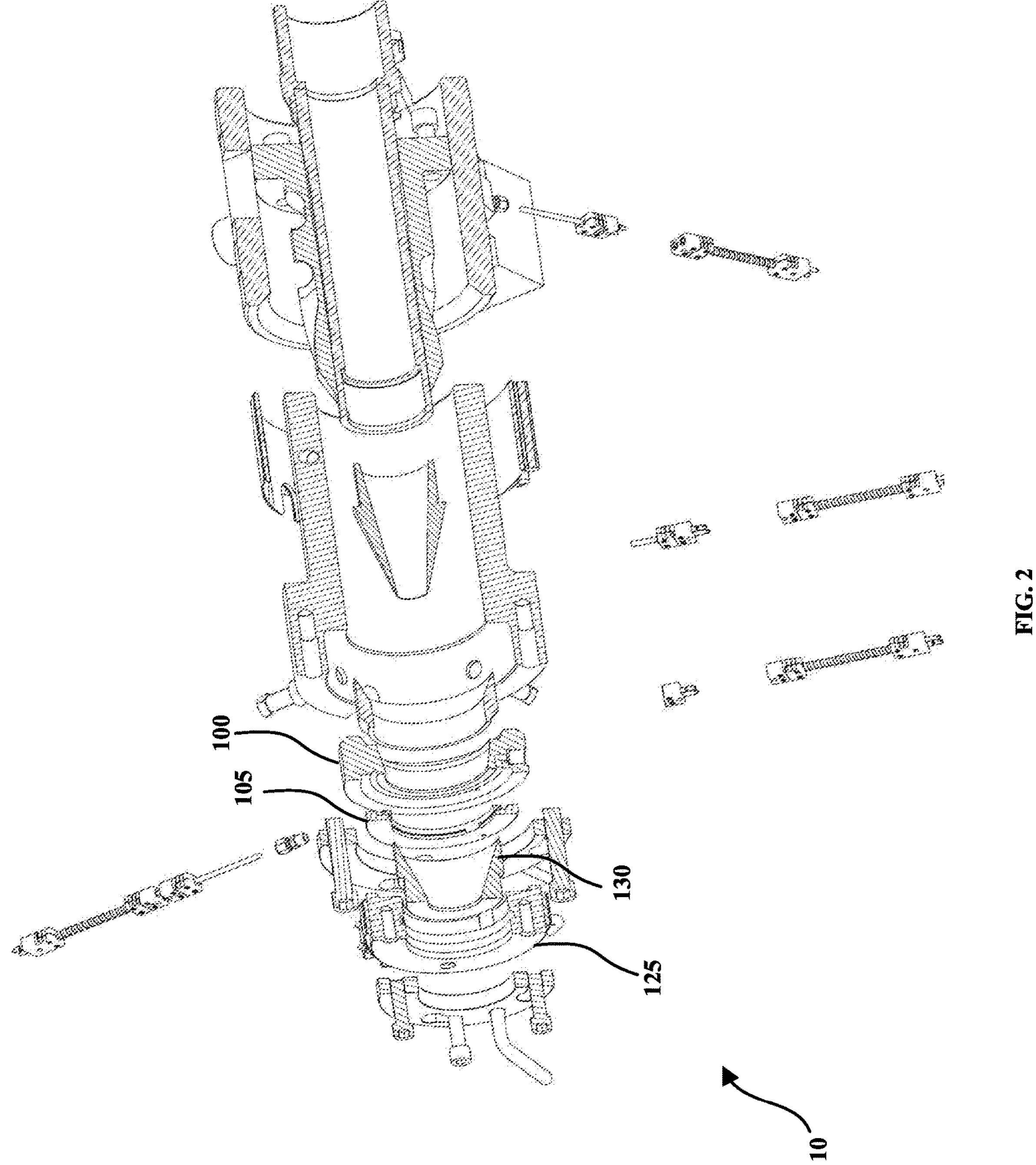
FIG. 2 is an exploded sectional view of the extruder assembly of FIG. 1.
Figure 3:
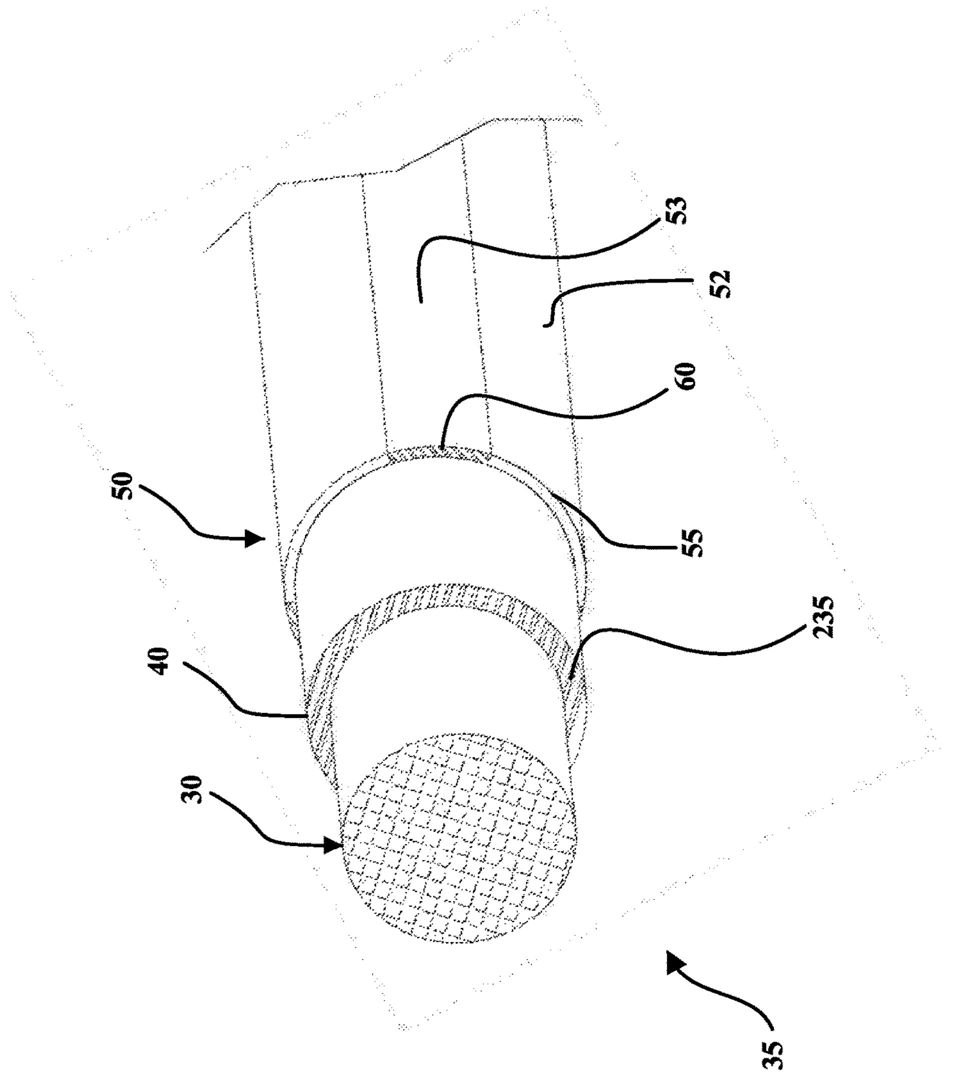
FIG. 3 is a perspective view of a wire according to an embodiment of the present application.
Figure 4:
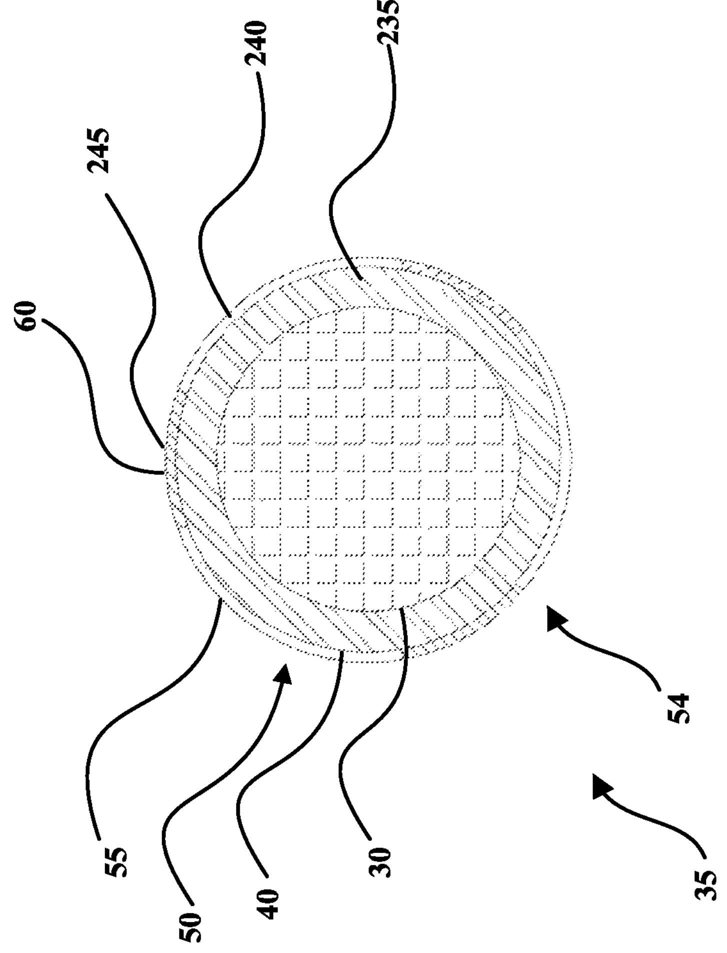
FIG. 4 is a cross-section of the wire of FIG. 3.
Figure 5:
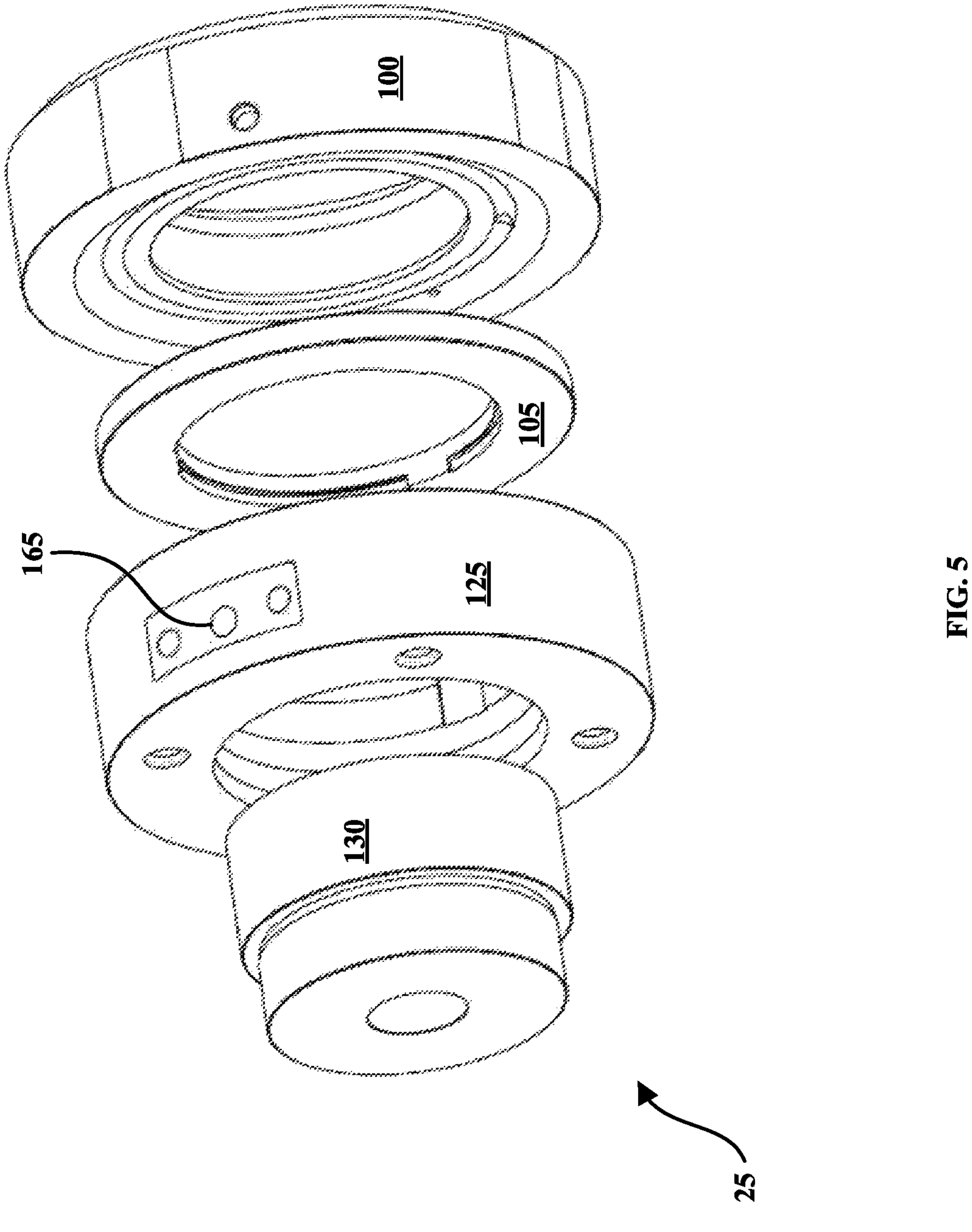
FIG. 5 is an exploded view of components of a subassembly of the extruder assembly of FIG. 1.

Specific embodiments of the present application are now described with reference to the figures. The following detailed description is merely exemplary in nature and is not intended to limit the concepts and uses of the concepts. Furthermore, there is no intention to be restricted by any expressed or implied theory in the present application. In the description, "downstream" is used with reference to the direction of the movement of the conductor while sleeves are extruded onto the conductor (i.e., direction A of FIG. 1), and also with reference to the order of components, or features thereof, through which the conductor moves from a source towards the sleeve extruders, whereas "upstream" is used with reference to the opposite direction. Depending on context, upstream and downstream can be used as relative or absolute terms.

Referring to FIGS. 1 to 4, an extruder assembly 10 comprises a barrel 15, a first subassembly 20, and a second subassembly 25. Barrel 15, through which a conductor 30 of a wire 35 can travel, defines an axis X. Axis X is a central axis of barrel 15. First subassembly 20 is for extruding a first sleeve 40 on conductor 30.

Second subassembly 25 is for extruding a second sleeve 50 onto first sleeve 40. Second sleeve 50 comprising a first portion 52, a second portion 53, and a cross-section 54 comprising a first annulus sector 55 and a second annulus sector 60. First portion 52 comprises first annulus sector 55 and second portion 53 comprises second annulus sector 60. First and second portions 52, 53 are in direct physical contact with first sleeve 40. First subassembly 20 and second subassembly 25 cooperate with barrel 15 to define a first channel 65 to extrude first and second sleeves 40, 50 onto conductor 30.

Referring to FIGS. 5-8, second subassembly 25 defines a second channel 70 and a third channel 75. First, second, and third channels 65, 70, 75 are all annular channels coaxial with axis X. Second channel 70 is to extrude first portion 52. Third channel 75 is to extrude second portion 53. Second channel 70 is in fluid communication with first channel 65 via a first opening 80. Second subassembly 25 comprises a protrusion 85 blocking first opening 80 at a location 90 of protrusion 85. Third channel 75 is in fluid communication with first channel 65 via a second opening 82 at a location 95 downstream of location 90.

Figure 7:
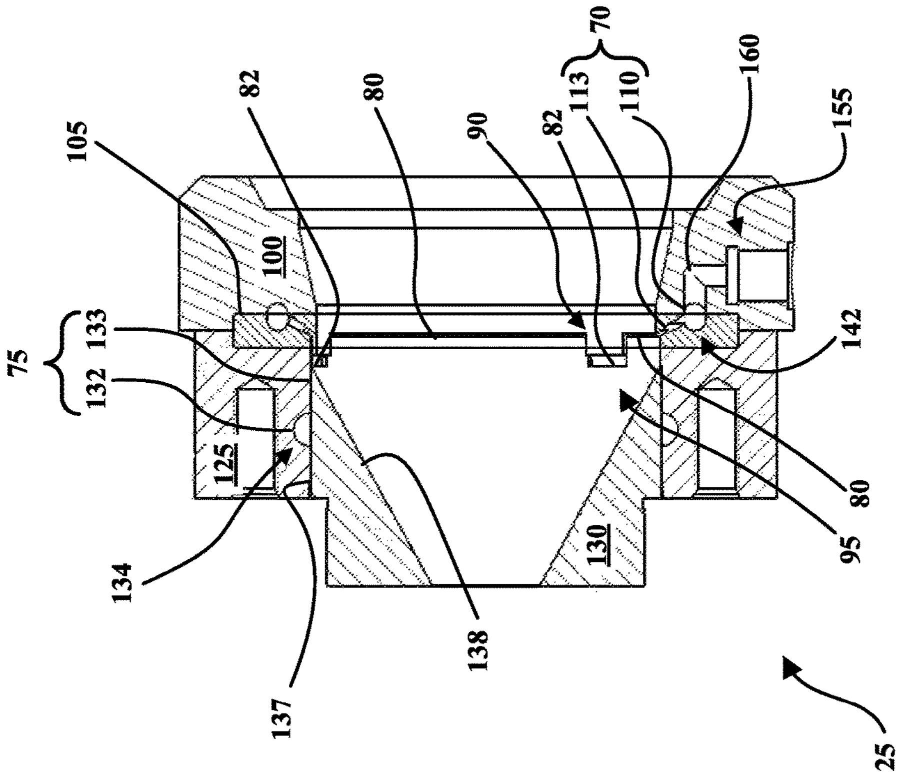
FIG. 7 is a sectional view of the subassembly of FIG. 5.
Figure 10:
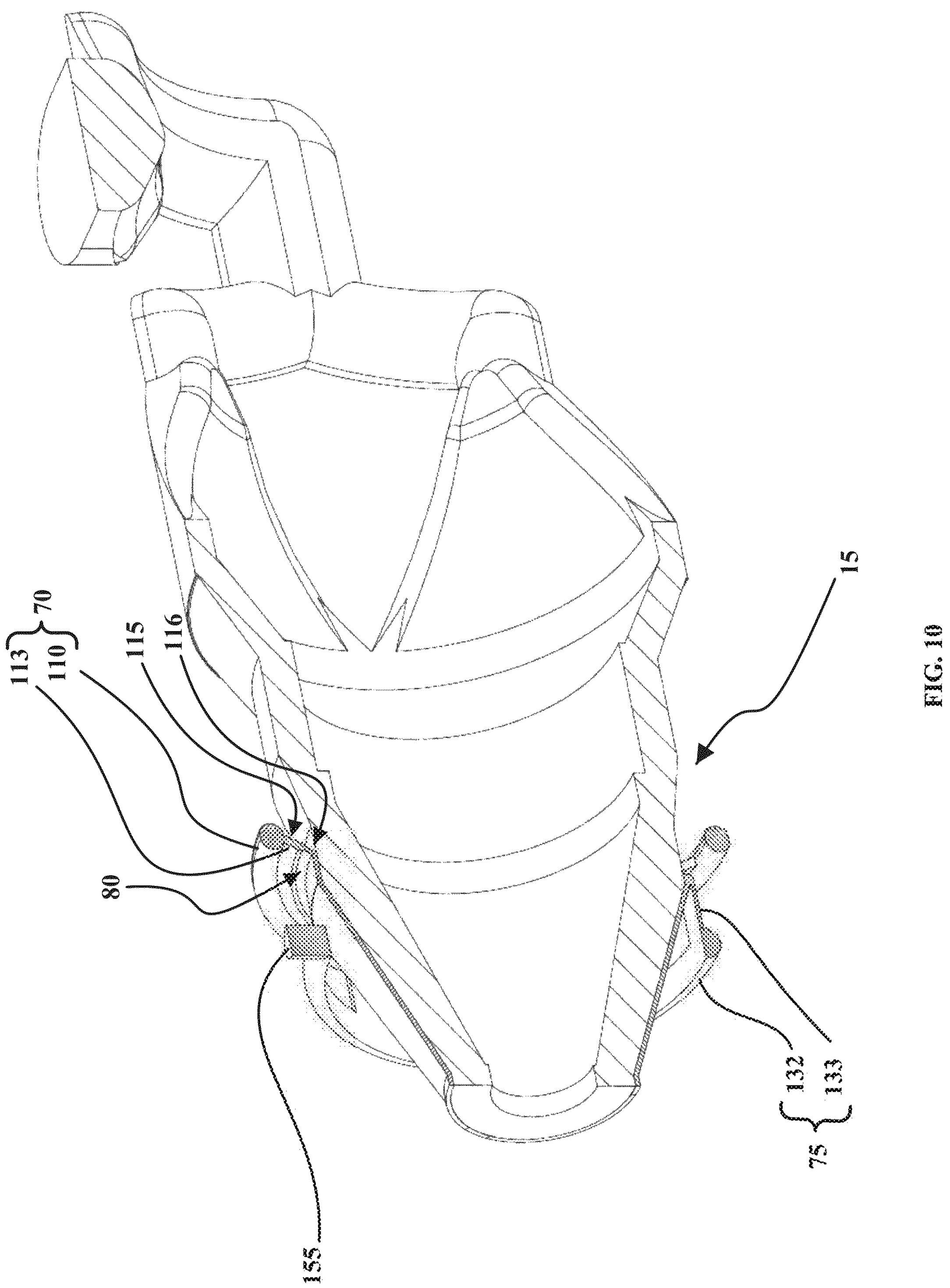
FIG. 10 is a perspective sectional view of the channels of the extruder assembly of FIG. 1.

Referring to FIG. 7, second subassembly 25 comprises a first member 100 and a second member 105 defining second channel 70. Second channel 70 comprises a ring portion 110 and a truncated cone shaped portion 113 connecting ring portion 110 to first channel 65. In the illustrated embodiments, truncated cone shaped portion 113 comprises an upstream end 115 and a downstream end 116 (see FIG. 10). Upstream end 115 having a width 117 and downstream end 116 having a width 118 (see FIG. 8). In the illustrated embodiments, width 117 is wider than width 118. First member 100 cooperates with second member 105 to define ring portion 110. Second member 105 defines truncated cone shaped portion 113. First opening 80 is located at a downstream end of truncated cone shaped portion 113. Second member 105 comprises a portion 119 of protrusion 85. Third member 125 comprises a portion 120 of protrusion 85. Portions 119, 120 together form protrusion 85. Portion 119 is upstream of portion 120.

Second subassembly 25 comprises a third member 125 and a fourth member 130 defining third channel 75. Third channel 75 is downstream of second channel 70. Third channel 75 comprises a ring portion 132 and an annular sector portion 133 connecting ring portion 132 to first channel 65 via a second opening 82 of annular sector portion 133. Second opening 82 is located upstream of ring portion 132. In the illustrated embodiments, ring portion 132 has a substantially semi-circular cross-section 134 and there are three annular sector portions 133 forming a segmented annular channel to connect ring portion 132 to first channel 65. However, a person of relevant ordinary skill in the relevant art would appreciate that any suitable number annular sector portion 133 can be implemented, depending on applications. Ring portion 132 is in fluid communication with first channel 65 via second opening 82 allowing molten material to flow from third channel 75 into first channel 65. Fourth member 130 comprises an outer curved surface 137 and an inner curved surface 138 (see FIG. 7). Outer curved surface 137 cooperates with third member 125 to define third channel 75. Inner curved surface 138 cooperates with a downstream portion 139 of barrel 15 to define a downstream portion 141 of first channel 65 (see FIG. 1). In the illustrated embodiments, ring portion 132 is downstream of ring portion 110. In the illustrated embodiments, ring portion 110 has a substantially circular cross-section 142. Substantially semi-circular cross-section 134 has a curved portion 143 and a straight portion 144 (see FIG. 8). Curved portion 143 is a surface of third member 125. Straight portion 144 is a portion of outer curved surface 137.

Figure 6:
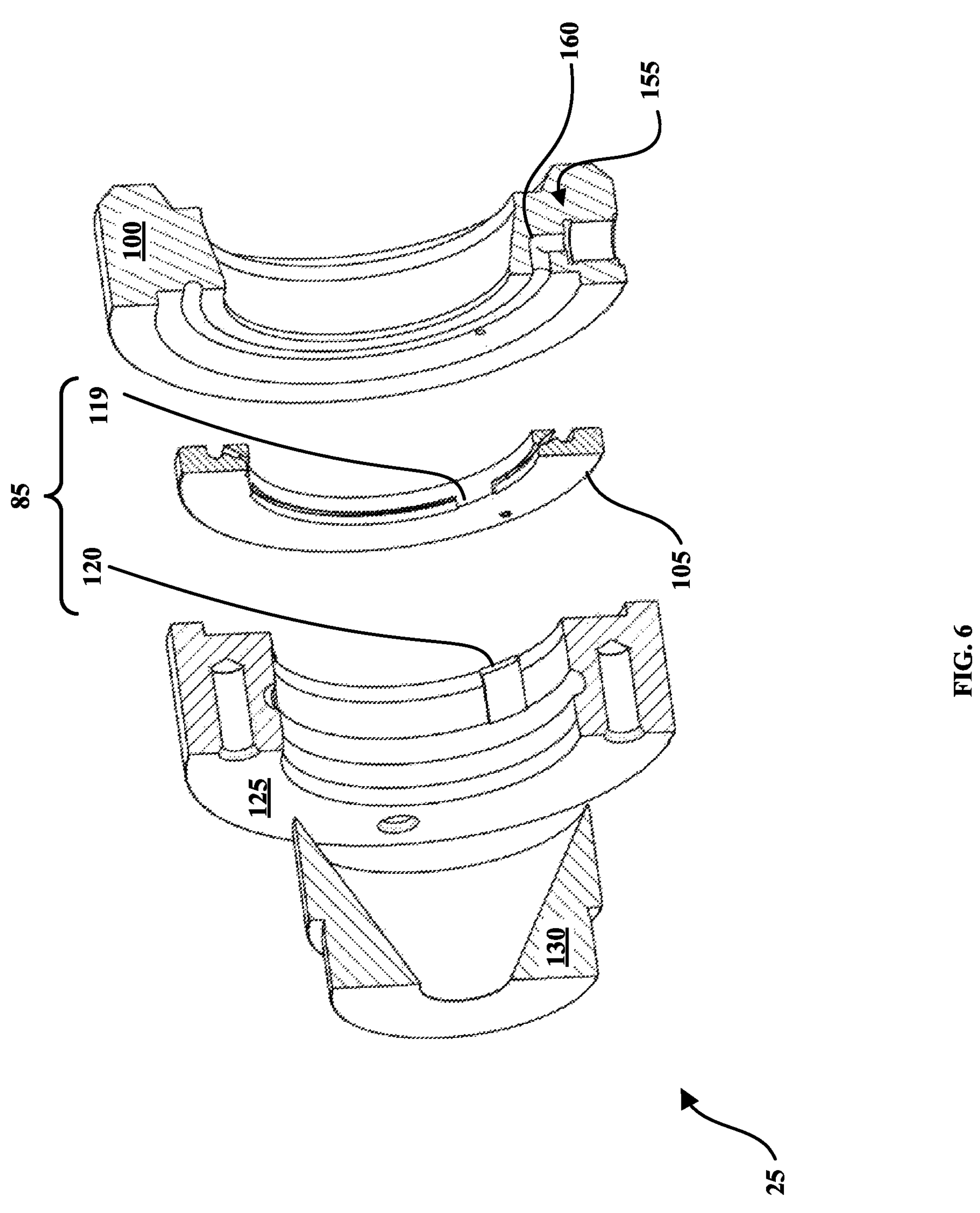
FIG. 6 is an exploded sectional view of components of the subassembly of FIG. 5.
Figure 8:
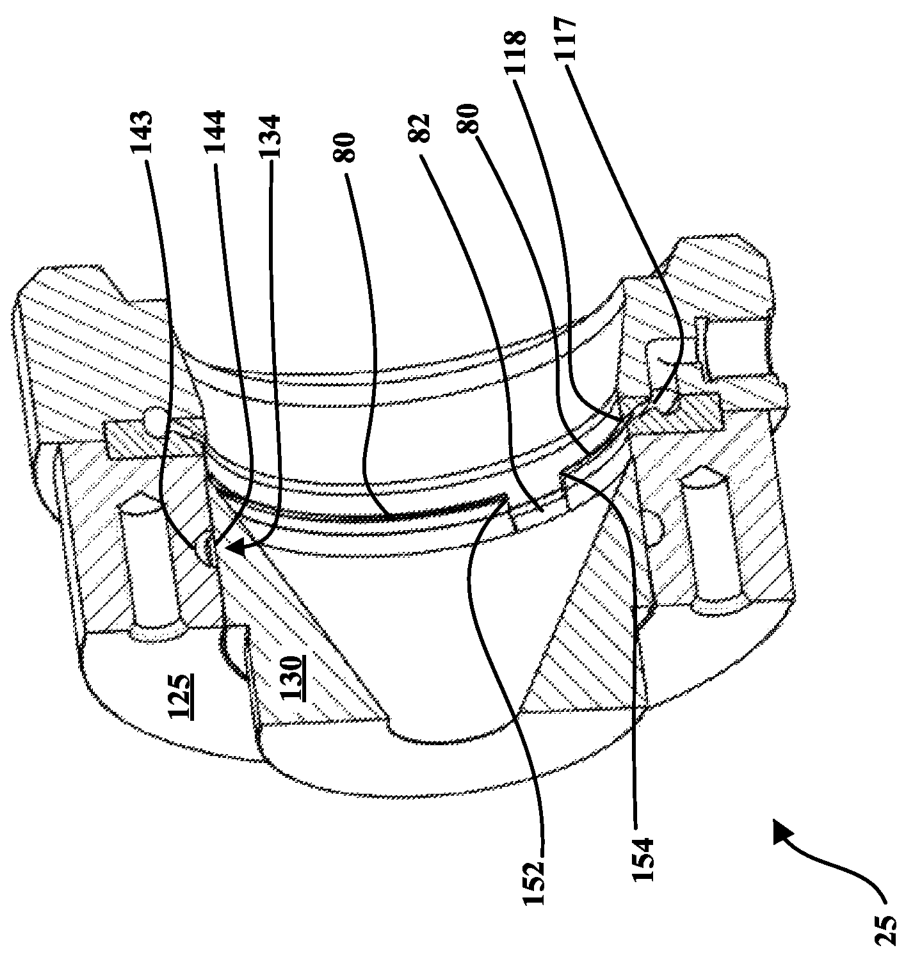
FIG. 8 is a perspective sectional view of the subassembly of FIG. 5.
Figure 9:
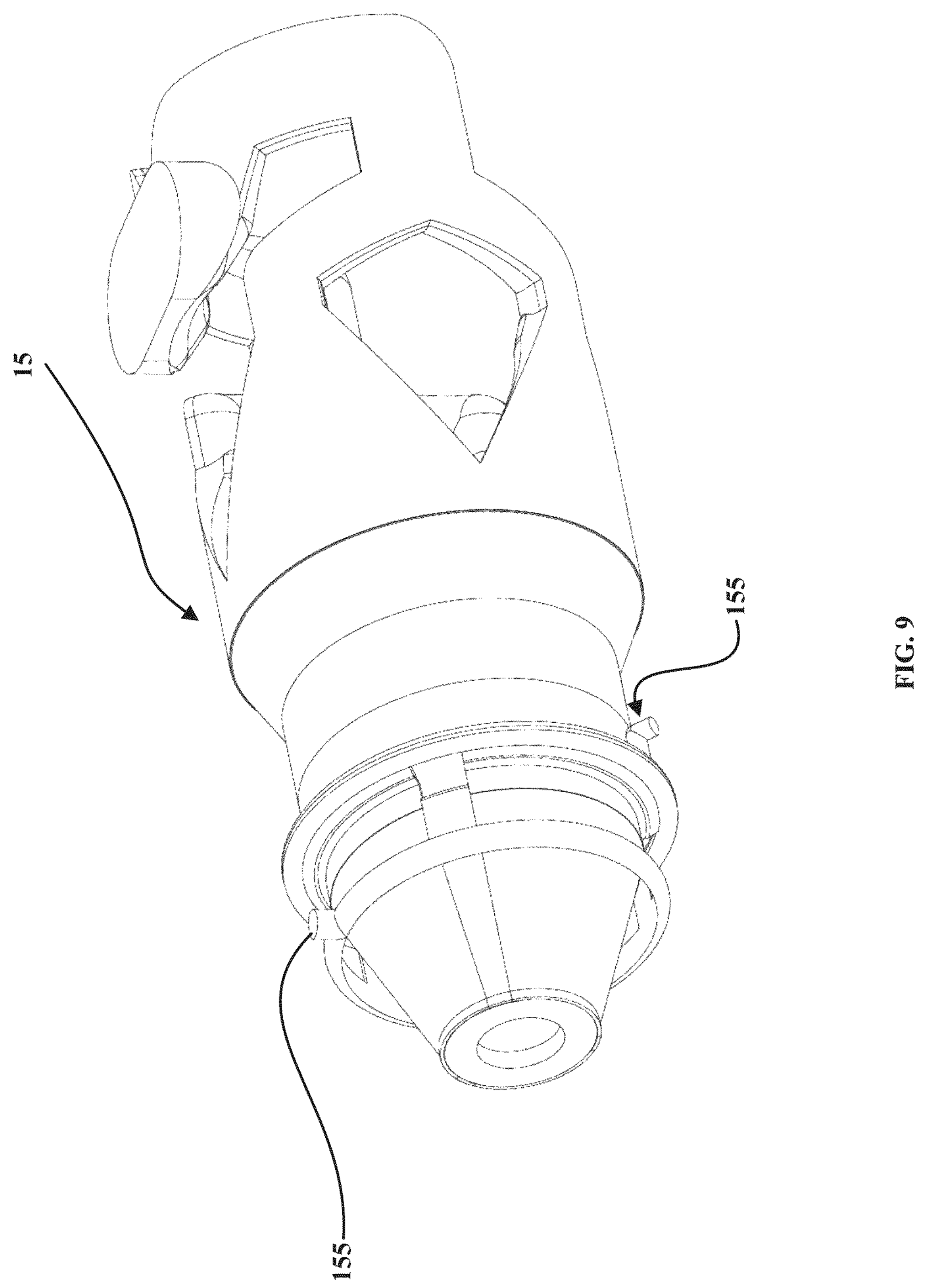
FIG. 9 is a perspective view of the channels of the extruder assembly of FIG. 1.

Referring to FIGS. 6, 7 & 8, molten material (not shown) used to extrude first portion 52 may enter first channel 65 via first opening 80. In the illustrated embodiments, there are three protrusions 85, spaced equiangularly apart, and three first openings 80, each first opening 80 located between two protrusions 85. Protrusions 85 define a first end 152 and second end 154 of first opening 80. Protrusions 85 block molten material used to extrude first portion 52 from entering first channel 65 at location 90 of protrusion 85. Molten material (not shown) used to extrude second portion 53 may enter first channel 65 via second opening 82. Second opening 82 is located at the angular location but downstream of protrusion 85. In the illustrated embodiments, there are three second openings 82. A person of relevant ordinary skill in the relevant art would appreciate that, depending on the applications, any number of suitable first opening 80 can be used based on the disclosure of the present application. For example, there can be one first opening 80 and one second opening 82, the annular ends 152, 154 of first opening 80 defined by a respective annular end of protrusion 85.

First member 100 defines a bore 155 for receiving the molten material from a source (not shown) to extrude first portion 52 (see FIG. 7). Bore 155 is in fluid communication with second channel 70. In the illustrated embodiments, bore 155 comprises an elbow 160. Third member 125 defines a bore 165 for receiving the molten material from a source (not shown) to extrude second portion 53 (see FIG. 5). Bore 165 is in fluid communication with second channel 70.

Referring to FIG. 1, first subassembly 20 comprises a fifth member 170 and a sixth member 175 partially defining first channel 65. In the illustrated embodiments, fifth member 170 is a helicoid. However, a person of relevant ordinary skill in the relevant art would appreciate that other suitable structures are possible for fifth member 170, depending on applications.

Extruder assembly 10 comprises a wedge ring 180 for fine tuning the molten material flow for first sleeve 40 and to provide a seal with first member 100 to prevent the leak of material of second sleeve 50 onto material of first sleeve 40. Varying the geometry of wedge ring 180 can control the back pressure in extruder assembly 10.

In the illustrated embodiments, extruder assembly 10 comprises a seventh member 185 and an eighth member 190. Seventh member 185 fastens first member 100 to sixth member 175 via fasteners 195. Eighth member 190 fastens fourth member 130 to second member 105 via fasteners 200. First member 100, second member 105, and third member 125 are fastened together via fasteners (not shown).

In the illustrated embodiments, extruder assembly 10 comprises heaters 205, 210, 215 and thermocouples 220, 225 to regulate the temperature of the molten material within extruder assembly 10.

In operation, as conductor 30 travels through barrel 15 in direction A (i.e., from upstream towards downstream direction), first subassembly 20 extrudes first sleeve 40, second subassembly 25 extrudes second sleeve 50 onto first sleeve 40, with the combined sleeves 40, 50 engaging conductor 30 as conductor 30 exits barrel 15 at a downstream end 230 of barrel 15. First sleeve 40 can comprise a first material 235 that can include (e.g., HDPE, LDPE, Flex PVC and other suitable materials). First portion 52 can comprise a second material 240 such as (e.g., HDPE, LDPE, Flex PVC and other suitable materials). Second portion 53 can comprise a second material 245 such as (e.g., HDPE, LDPE, Flex PVC and other suitable materials). Depending on applications, first material, second material, and third material can all be the same or different. Depending on applications, first material, second material, and third material can all have the same color or different colors.

In operation, first sleeve 40 is extruded upstream of a location 250 where second sleeve 50 is extruded.

While various embodiments according to the present application have been described above, it should be understood that they have been presented by way of illustration and example only, and not limitation. It will be apparent to persons of relevant ordinary skill in the relevant art that various changes in form and detail can be made therein without departing from the scope of the present application. It will also be understood that each feature of each embodiment discussed herein, may be used in combination with the features of any other embodiment. Thus, the breadth and scope of the present application should not be limited by the above-described exemplary embodiments, but should be defined only in accordance with the appended claims and their equivalents.

What is claimed is:

1. An extruder assembly comprising:

a barrel, through which a conductor can travel;

a first subassembly for extruding a first sleeve on the conductor; and a second subassembly for extruding a second sleeve onto the first sleeve, the second sleeve comprising a first portion, a second portion, and a cross-section comprising a first annulus sector and a second annulus sector, the first portion comprising the first annulus sector, the second portion comprising the second annulus sector, the first and second portions are in contact with the first sleeve, the first subassembly and the second subassembly cooperate with the barrel to define a first channel to extrude the first sleeve and the second sleeve onto the conductor, the second subassembly defining a second channel and a third channel, the first, second, and third channels are all annular channels, the second channel to extrude the first portion, the third channel to extrude the second portion, the second channel is in fluid communication with the first channel via a first opening, the second subassembly comprising a protrusion blocking partially the first opening at a location of the protrusion, the third channel is in fluid communication with the first channel via a second opening at a location downstream of the location of the protrusion;

wherein the second subassembly comprises a first member and a second member defining the second channel, wherein the second subassembly comprises a third member and a fourth member defining the third channel, and wherein the second member comprises a portion of the protrusion and the third member comprises another portion of the protrusion.

2. The extruder assembly of claim 1 wherein the second channel comprises a ring portion and a truncated cone shaped portion connecting the ring portion to the first channel.

3. The extruder assembly of claim 2 wherein the first member cooperates with the second member to define the ring portion.

4. The extruder assembly of claim 3 wherein the second member defines the truncated cone shaped portion.

5. The extruder assembly of claim 1 wherein the third channel comprises a ring portion and a third annular sector portion connecting the ring portion to the first channel.

6. The extruder assembly of claim 5 wherein the third channel is downstream of the second channel.

7. The extruder assembly of claim 6 wherein the fourth member comprises an outer curved surface and an inner curved surface, the outer curved surface cooperates with the third member to define the third channel, and the inner curved surface cooperates with a downstream portion of the barrel to define a downstream portion of the first channel.

8. The extruder assembly of claim 7 wherein the ring portion of the third channel is downstream of the ring portion of the second channel.

9. The extruder assembly of claim 8 wherein the third annular sector portion includes an opening upstream of the ring portion of the third channel to allow a molten material to flow from the ring portion of the third channel into the first channel.

10. The extruder assembly of claim 9 comprising an another protrusion partially blocking the first opening at a location of the another protrusion, the third channel is in fluid communication with the first channel via a third channel opening at a location downstream of the location of the another protrusion.

* * * * *